United States Patent
Jafri et al.

(10) Patent No.: US 9,710,392 B2
(45) Date of Patent: Jul. 18, 2017

(54) VIRTUAL MEMORY MAPPING FOR IMPROVED DRAM PAGE LOCALITY

(71) Applicant: Advanced Micro Devices, Inc., Sunnyvale, CA (US)

(72) Inventors: Syed Ali Jafri, Bellevue, WA (US);
Yasuko Eckert, Kirkland, WA (US);
Srilatha Manne, Portland, OR (US);
Mithuna S Thottethodi, West Lafayette, IN (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 176 days.

(21) Appl. No.: 14/460,550

(22) Filed: Aug. 15, 2014

(65) Prior Publication Data
US 2016/0049181 A1  Feb. 18, 2016

(51) Int. Cl.
*G06F 12/10*  (2016.01)
*G06F 12/1009*  (2016.01)

(52) U.S. Cl.
CPC .. *G06F 12/1009* (2013.01); *G06F 2212/1024* (2013.01); *G06F 2212/654* (2013.01); *G06F 2212/655* (2013.01); *G06F 2212/656* (2013.01)

(58) Field of Classification Search
CPC ......... G06F 12/1009; G06F 2212/1024; G06F 2212/654; G06F 2212/655; G06F 2212/656
See application file for complete search history.

(56) References Cited

U.S. PATENT DOCUMENTS

2016/0055088 A1* 2/2016 Zhang ................ G06F 12/0862
711/137

* cited by examiner

*Primary Examiner* — Yong Choe
(74) *Attorney, Agent, or Firm* — Staniford Tomita LLP

(57) ABSTRACT

Embodiments are described for methods and systems for mapping virtual memory pages to physical memory pages by analyzing a sequence of memory-bound accesses to the virtual memory pages, determining a degree of contiguity between the accessed virtual memory pages, and mapping sets of the accessed virtual memory pages to respective single physical memory pages. Embodiments are also described for a method for increasing locality of memory accesses to DRAM in virtual memory systems by analyzing a pattern of virtual memory accesses to identify contiguity of accessed virtual memory pages, predicting contiguity of the accessed virtual memory pages based on the pattern, and mapping the identified and predicted contiguous virtual memory pages to respective single physical memory pages.

12 Claims, 3 Drawing Sheets

VIRTUAL MEMORY MAPPING FOR IMPROVED DRAM PAGE LOCALITY

TECHNICAL FIELD

Embodiments relate generally to virtual memory accesses, and more specifically to mapping contiguous virtual memory pages to improve system memory page locality.

BACKGROUND

Virtual memory is a memory management technique that enlarges the address space of main physical memory (e.g., DRAM) by utilizing secondary memory (e.g., disk space). To facilitate copying virtual memory into physical memory, virtual memory addresses are divided into pages, each of which is of a pre-defined size, such as 4 KB per page. Pages thus comprise blocks of contiguous memory addresses. This allows the physical address space of a process to be non-contiguous, and hides fragmentation of physical memory by providing contiguous address spaces to application processes. When a process is executed, a memory management unit (MMU) uses page tables to translate virtual addresses into the physical addresses used by the hardware. Flags indicate whether accessed pages are present in real memory, and if not, a page fault exception is generated and the memory unit accesses secondary storage to return the page corresponding to the accessed virtual address.

Although the size of a process's virtual address space is traditionally larger than the available physical memory space, physical memory pages (DRAM pages) or rows in DRAM memory arrays are now generally larger than virtual memory pages. While a virtual memory page is typically on the order of 4 KB in size, a DRAM page can be 16 KB or more. If contiguous virtual memory pages or virtual memory pages that are accessed close together in time are allocated to different, non-contiguous DRAM pages, the address mapping would create a lack of read/write locality in the DRAM. DRAM accesses generally impose a significant amount of communication overhead in a processor. Upon a memory access, an entire page is put into the row buffer before an access can happen. Swapping pages due to lack of locality can therefore be quite expensive in terms of processor cycles. If the process involves both a read and a write, the bus must switch direction as well. Locality is thus very important, even for simple read operations.

Certain methods have been developed to simplify virtual-to-physical memory address translation, such as reservation-based physical page allocators, that allocate contiguous virtual memory pages to physical memory blocks. However, such methods typically involve the mapping of significantly large-scale pages, such as on the order of 2 MB, which corresponds to a superpage. Such methods aim to maintain the translation of single large pages, rather than enhancing DRAM locality to reduce memory access latency.

What is needed is a system that maps contiguous virtual memory pages, or pages that are accessed in a short period of time by a process/application to a single DRAM page, thus improving locality for read/write accesses at the DRAM.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Embodiments are directed to a method for mapping virtual memory pages to physical memory pages by analyzing a sequence of memory-bound accesses to the virtual memory pages, determining a degree of contiguity between the accessed virtual memory pages, and mapping sets of the accessed virtual memory pages to respective single physical memory pages. In this embodiment, each respective single physical memory page is an integral multiple of a number of virtual memory pages in the sets of the accessed virtual memory pages. The virtual memory pages may be implemented in non-volatile secondary memory remotely accessible by a processor-based computer system, and wherein the physical memory pages are implemented as dynamic random access memory (DRAM) directly accessible or local to the processor-based computer system. In a first variant of the embodiment, the virtual memory pages are assumed to be sequentially accessed to form at least a set of contiguous accessed virtual memory pages. In a second variant of the embodiment, the method further comprises performing a profile run to determine a plurality of virtual memory pages that are accessed contiguously, and mapping the determined contiguously accessed virtual memory pages to the respective single physical memory pages. In a third variant of the embodiment, the method further comprises analyzing memory accesses as they are performed by the processor-based computer system to identify a plurality of virtual memory pages that are accessed contiguously, determining a cost of re-mapping the identified virtual memory pages relative to a benefit based on processor cycle consumption by the processor-based computer, and mapping the identified virtual memory pages if the benefit exceeds the cost. This variant may also analyze a temporal proximity of sequential pairs of virtual memory pages of the plurality of virtual memory pages, and analyze one or more other properties of the memory accesses to modify a mapping of the virtual memory pages to the respective physical memory pages, wherein the one or more other properties comprises write intensity, virtual page permission and access types, durations of virtual memory page accesses, and a power consumption characteristic of the virtual memory accesses. The method may be implemented as an operating system process executed by the processor-based computer; or it may be implemented at least in part as a hardware circuit associated with a memory controller device or the physical memory and performing a lookup table process to convert virtual memory addresses to physical memory addresses.

Embodiments are further directed to a method for increasing locality of memory accesses to dynamic random access memory (DRAM) in virtual memory systems by analyzing a pattern of virtual memory accesses to identify contiguity of accessed virtual memory pages, predicting contiguity of the accessed virtual memory pages based on the pattern, and mapping the identified and predicted contiguous virtual memory pages to respective single physical memory pages. The accessed virtual memory pages may be assumed to be sequentially accessed to form the identified contiguous virtual memory pages. The method may further comprise performing a profile run to analyze the pattern of virtual memory accesses, and defining the indentified virtual memory pages to be virtual memory pages accessed together based on a history of memory accesses. The method may yet further comprise analyzing the memory accesses as they are performed by a processor-based computer system implementing a virtual memory mechanism between secondary memory and the DRAM, determining a cost of re-mapping the identified virtual memory pages relative to a benefit based on processor cycle consumption by the processor-based computer, and performing the mapping if the benefit exceeds the cost.

Embodiments are also directed to memory access systems and circuits according to one or more methods described herein. Thus, some embodiments are directed to an apparatus or system comprising one or more processing elements that perform the acts or process steps of the two methods described above.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Memory-bound processes often make memory accesses that stride across different virtual memory pages or make scanning accesses across contiguous virtual memory pages or make scanning accesses across contiguous virtual memory pages. If these virtual memory pages are mapped to different physical memory (DRAM) pages, the accesses increase memory latency due to lack of locality that reduces DRAM row buffer hits. Embodiments are directed to systems and methods that improve DRAM page locality by mapping contiguous virtual memory pages to the same or contiguous DRAM pages.

For purposes of the description, the term virtual memory generally refers to memory that is used by a memory management unit or similar component to expand physical or main memory used by a computer or processor-based system. Virtual memory may be embodied in a device or medium referred to as secondary memory; physical memory generally represents random access memory that is local to the processor or CPU (central processing unit), and may be embodied in and referred to as DRAM memory.

Figure 1:
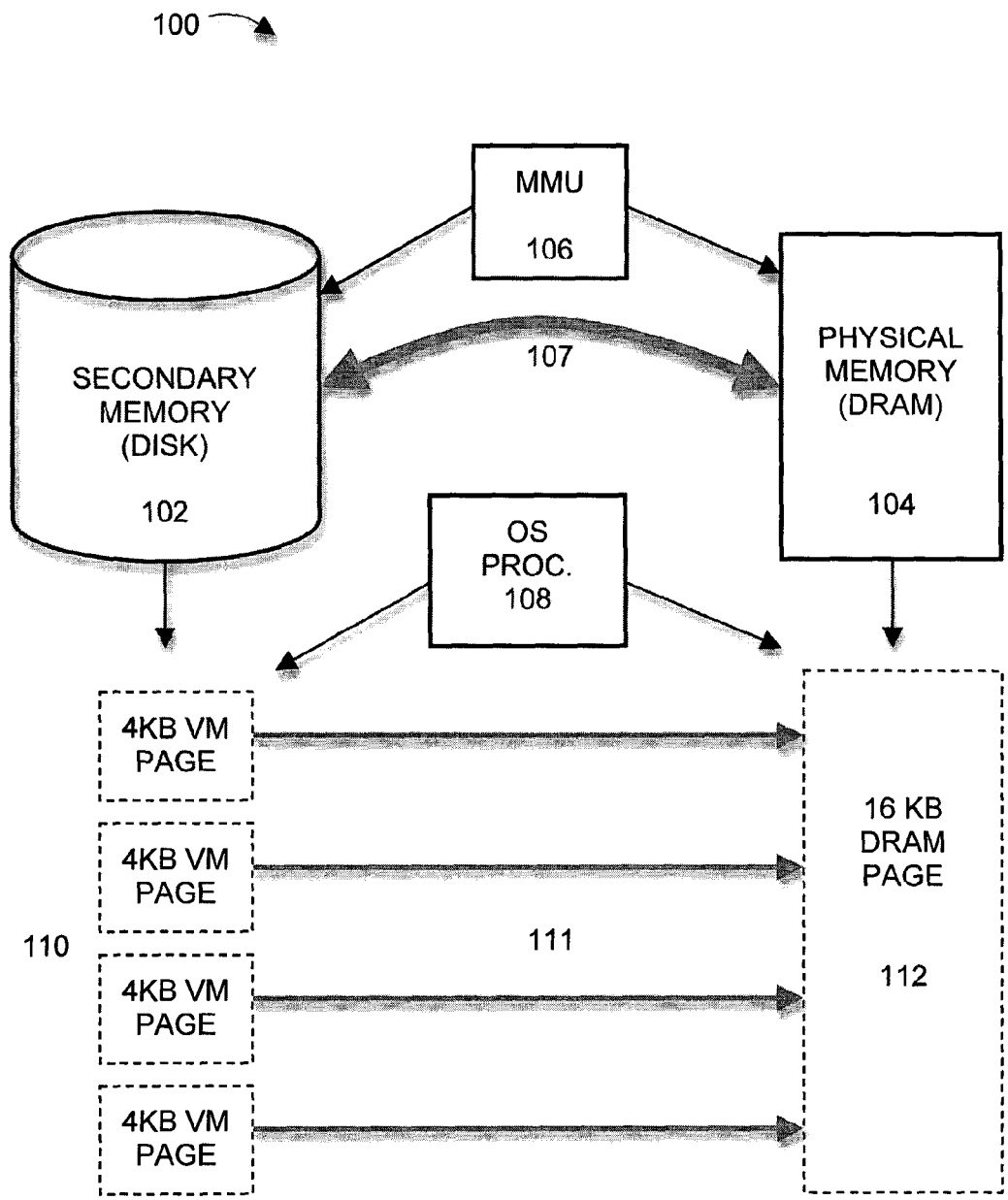
FIG. 1 illustrates mapping contiguous virtual memory pages to same physical memory pages using an operating system process, under some embodiments.

FIG. 1 illustrates mapping contiguous virtual memory pages to same physical memory pages using an operating system process, under some embodiments. As shown in diagram 100 of FIG. 1, a memory management unit (MMU) 106 or similar circuit or hardware component manages the data transfers between secondary memory 102, which is typically a non-volatile external memory such as a disk (optical, magnetic, etc.), tape, flash drive, or other similar persistent memory medium, and physical random access memory, such as DRAM or any other local volatile memory medium. The MMU 106 translates virtual addresses used by the program or processes into real addresses of the physical memory 104 through mapping operations that effectively increase the perceived amount of physical memory by supplementing it with secondary memory 102. The MMU 106 also manages the copying of virtual pages from the secondary memory 102 into the physical memory 104 through paging or swapping operations 107 when the accessed memory locations are in the secondary memory 102 instead of the physical memory 104.

As shown in FIG. 1, the virtual address space of the secondary memory is organized into a number of pages 110, each of which is of a defined size. In a typical embodiment, the size of each page is 4 KB, but other sizes are also possible. Likewise, the physical memory is arranged into pages 112 that are larger than each of the virtual memory pages 110. For the example embodiment of diagram 100, the physical memory page is 16 KB, though other sizes are also possible; this gives a ratio of virtual memory pages to physical memory pages of four-to-one, though other ratios are possible if the virtual memory and/or physical memory page sizes are different. In general, it is assumed that the operating system will know, through a definition statement or similar mechanism, how many virtual memory pages will fit into a single physical memory page.

As a preliminary step, the operating system process may analyze the type of memory access being performed to distinguish between the two main types of memory accesses: memory bound accesses and cache accesses. Cache accesses generally involve data that is heavily re-used, while memory-bound accesses often involve applications that perform accesses that stride across different virtual memory pages, such as streaming data (e.g., audio or video) or similar input/output processes. Embodiments are generally directed improving locality for memory-bound accesses rather than strictly cache accesses, since inefficiencies in regard to locality issues is significantly more marked in memory-bound rather than cache-bound accesses.

In an embodiment, an operating system (OS) process 108 directly maps contiguous virtual memory pages 110 onto the same physical memory page 112. The OS process 108 assumes that contiguous virtual memory pages are accessed together. Such virtual memory pages may be allocated contiguously in the physical address space, in which case, the OS process 108 may verify this contiguity prior to performing the mapping operation 111, or simply map a set number of virtual memory pages (e.g., three pages) following a first accessed virtual memory page to contiguous locations of a single physical memory page to produce a contiguous four-to-one virtual memory to physical memory page mapping. Alternatively, the operating system process 108 may reserve all physical pages that lie on the physical page when the first virtual memory page is allocated on that physical memory page.

Instead of simply assuming that the accessed memory pages are contiguous, the process 108 may perform a profile run to determine and identify virtual memory pages that are accessed together. A page allocator in the operating system may then use this profile to allocate such virtual memory pages on the same DRAM pages in physical memory. In this manner, the profile, as based on past contiguous access is used to predict future contiguous access for mapping the virtual memory pages to physical memory pages.

Figure 2:
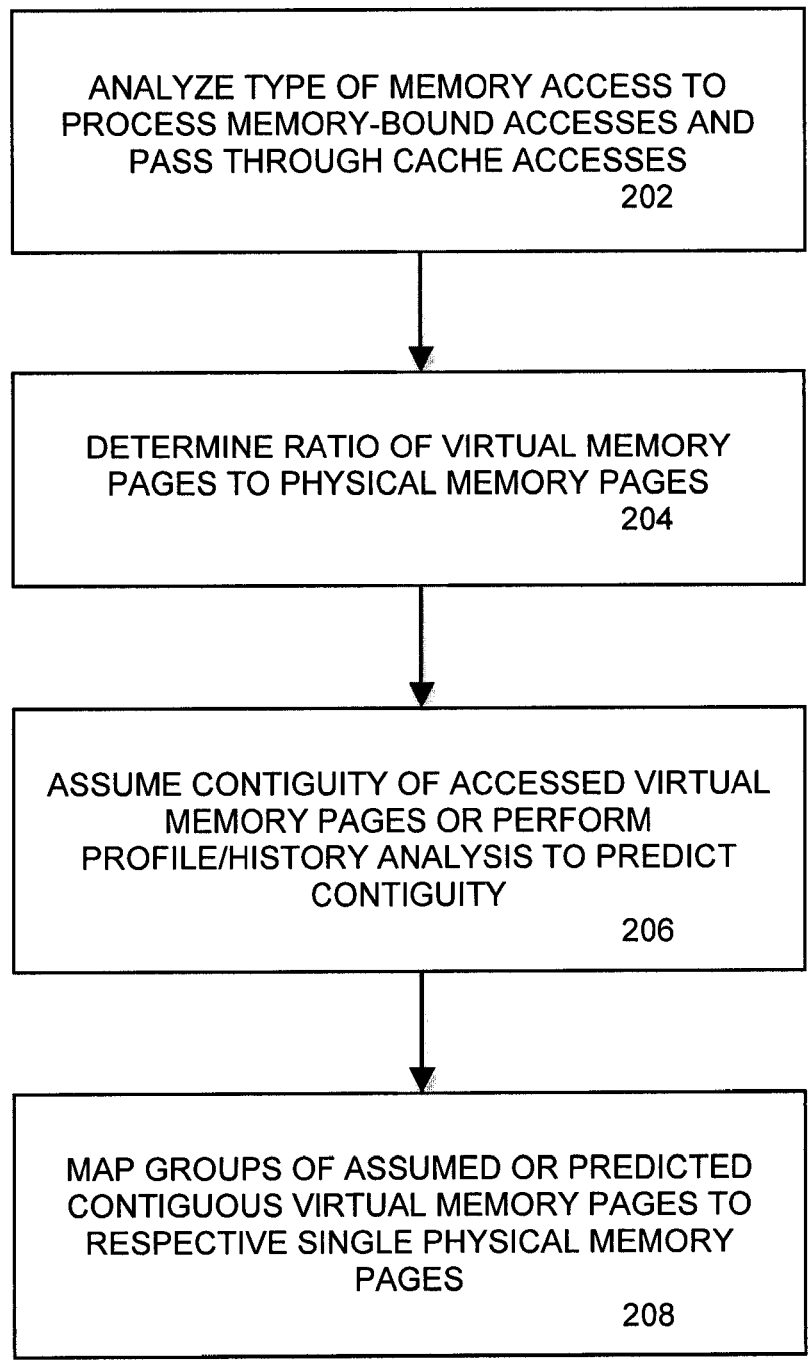
FIG. 2 is a flowchart that illustrates a method of mapping contiguous virtual memory pages to physical memory pages, under a first embodiment.

FIG. 2 is a flowchart that illustrates a method of mapping contiguous virtual memory pages to physical memory pages, under a first embodiment. The method of FIG. 2 starts with an analysis of the type of memory access. The operating system distinguishes between cache accesses and memory-bound accesses to process only the memory-bound accesses in the virtual memory page mapping process, 202. The operating system next determines the ratio of virtual memory pages to single physical memory pages, 204. It is assumed that the virtual memory pages are of the same set size and that the physical memory pages are at least an integral multiple times the size of a virtual memory page, such as 4:1, 8:1, and so on. As shown in step 206, the process assumes contiguity of accessed virtual memory pages or it performs a profile analysis to predict contiguity of accessed virtual memory pages. The process then maps groups of contiguous assumed or predicted virtual memory pages to respective single physical memory pages, 208. Whether based on an assumption that the contiguous virtual memory pages that are accessed together are contiguous or are predicted to be contiguous, this illustrated method constitutes a static variant of the embodiment in which the data is mapped based upon an assumed/predicted contiguity of the virtual memory pages regardless of the type or nature of the data.

In an alternative embodiment, the operating system process 108 dynamically analyzes ("on the fly") the data as it is processed to determine whether or not the virtual memory pages 110 are accessed together. In this embodiment, the virtual memory pages 110 may or may not be contiguous, but a history-based analysis component in the operating system process 108 generates a profile of the data to determine an optimal mapping on the physical memory page 112. In many cases, memory-bound accesses often involve streaming data that strides across several different virtual memory pages. Such accesses often inherently possess some degree of contiguity that may be taken advantage of by process 108, since it is highly likely that blocks of VM pages are accessed in close temporal proximity of one another.

Figure 3:
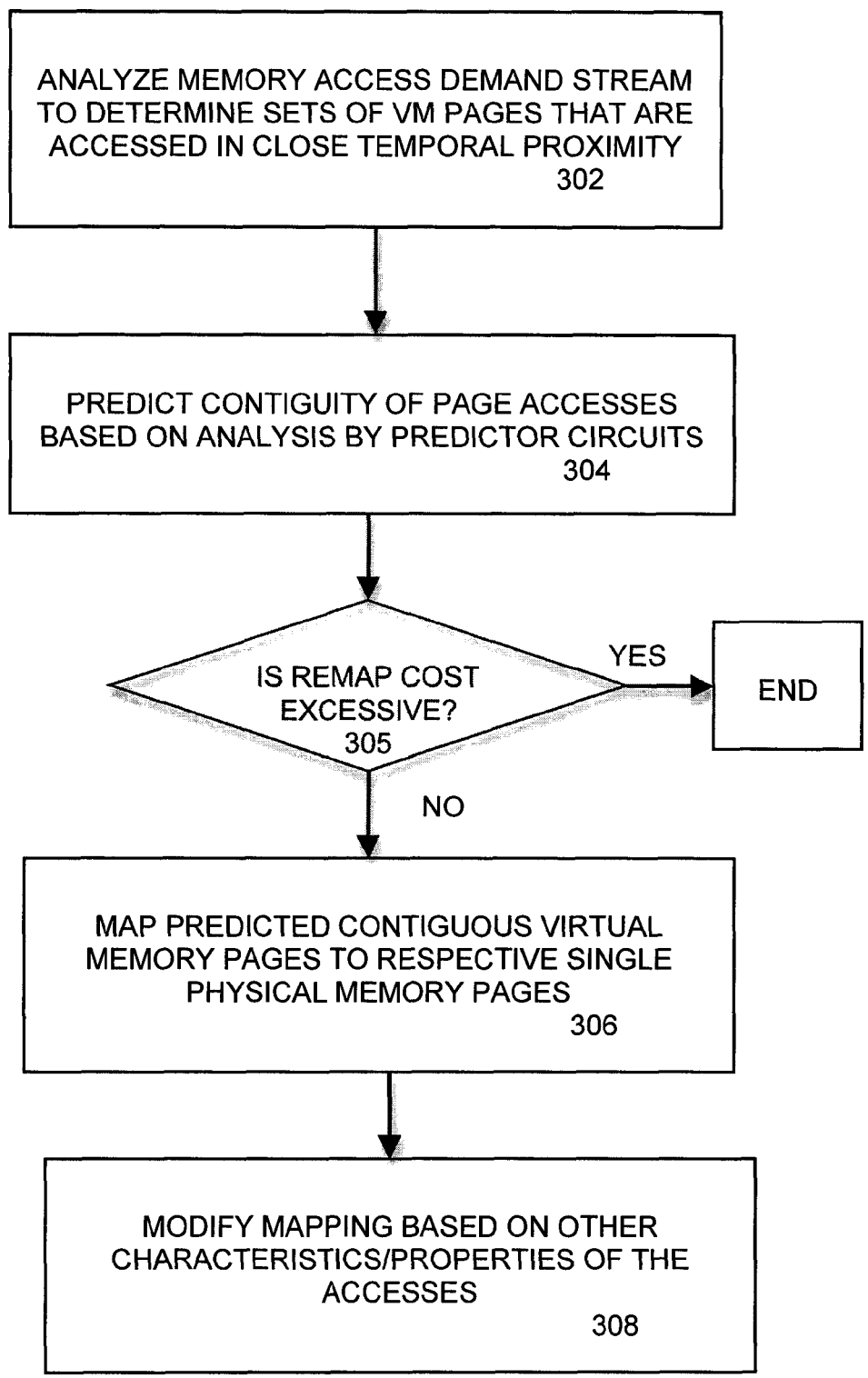
FIG. 3 is a flowchart that illustrates a method of mapping contiguous virtual memory pages to physical memory pages, under a second embodiment.

FIG. 3 is a flowchart that illustrates a method of mapping contiguous virtual memory pages to physical memory pages, under an embodiment that utilizes dynamic analysis of the memory accesses. For the embodiment of FIG. 3, the process starts by analyzing the demand stream to determine which sets of virtual memory pages will be accessed in close temporal proximity of one another, 302. This analysis may be performed by using information from prefetchers that know that virtual memory addresses associated with the accesses. It may also be performed using a combination of a program counter and saturation counter circuit. The program counter stores instruction addresses for each virtual memory page, and a saturation counter is a counter that resets after hitting a pre-set threshold. For this type of circuit, the process determines whether the program continuously hits the same virtual memory page, and uses the saturation counter to reset after a defined number of cycles. If the program counter indicates sequential address hits, the process assumes that future accesses will hit the same virtual memory page as well. In this way, the prefetch circuit and the program/saturation counter circuits comprise predictor circuits that allow the process to predict whether or not future accesses will hit the same or different virtual memory pages as a current access. With reference to FIG. 3, the process predicts the contiguity of page access based on this analysis by the predictor circuit or circuits, 304. The process then maps the predicted contiguous virtual memory pages to the same physical memory page for increased locality of reads and writes to the physical memory, 306.

The dynamic mapping of virtual memory pages may require page remapping to collocate virtual memory pages because virtual memory pages may be allocated to different physical memory pages before the analysis by the operating system process determines that the virtual memory pages must be collocated on the same physical memory page. In such cases, the benefits of collocation must be weighed against the costs of page remapping. Thus, as shown in FIG. 3, the system may perform a cost/benefit determination 305 prior to the mapping step 306. The cost of remapping is typically associated with the overhead associated with activating a DMA (direct memory access) cycle. The determination component may examine the frequency of accesses to determine whether or not there are a minimum number of accesses to a virtual memory page and assume that there will be future accesses, in which case it is beneficial to re-map the virtual memory page. The cost may be expressed as total cycles, as well as power. When power is a factor, the operating mode of the processor may be taken into account. The system may prioritize power over cycles under certain conditions (e.g., power savings mode) or vice-versa (e.g., high performance mode). The cost determination step basically looks at the frequency of accesses, then assumes the same number of accesses to the same virtual page(s), and compare the assumption to parameters that capture the cost of DRAM accesses when they hit or not hit. In general, the cost of a memory access is set by the system and is determined by factors, such as DRAM speed, type, technology, and so on. It is also dependent on whether there is a row buffer hit or not.

The mapping process may also take into account other characteristics or properties of the access, such as the write intensity of the virtual memory page, page permission and access types, and/or the durations of the virtual memory page access. For example, in a case in which virtual memory pages A and B have short access durations and are accessed closely in time to another, and another virtual memory page C is accessed throughout the runtime of an application, page C may be mapped onto a different physical memory page to A and B in order to optimize the mapping for both (DRAM) row buffer hits and bank-level parallelism. If such properties indicate that a different mapping is more optimum, the original mapping 306 may be modified, 308.

As a software process, the embodiments described herein generally do not add much overhead to memory access operations since the processes execute during exception processing, namely page fault periods. For example, a page fault may result in the loss of on the order of 1,000 to 1,500 processor cycles, while the memory mapping process described herein imposes an overhead of around 100 cycles.

Although embodiments are described with respect to implementation through operating system processes, other mechanisms may also be used. For example, in as an application process through an API (application program interface). In an alternative embodiment, the virtual memory mapping process is implemented in hardware using a lookup table that converts a physical address to a location in the physical memory (DRAM). This approach adds a level of indirection before accessing the physical memory, and ensures compatibility with any operating system at the cost of accessing a potentially large table for every physical memory access. Such a circuit could be implemented as a component in the memory controller or on the memory device itself.

Any of the embodiments described herein may be used alone or together with one another in any combination. The one or more implementations encompassed within this specification may also include embodiments that are only partially mentioned or alluded to or are not mentioned or alluded to at all in this description or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the terms "component," "module," "circuit," and "process," may be used interchangeably to refer to a circuit element or processing unit that performs a particular function. Such a function may be implemented purely in hardware or it may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method described herein.

Some embodiments are also directed to computer readable media comprising a data structure that is operated upon by a program executable on a computer system. The program operates on the data structure to perform a portion of a process to fabricate an integrated circuit including circuitry described by the data structure. The circuitry described in the data structure includes providing a method of mapping virtual memory pages to physical memory pages based on assumed or determined or predicted contiguity of the virtual memory pages to improve the locality of physical memory accesses.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for mapping virtual memory pages to physical memory pages, comprising:
analyzing a sequence of memory-bound accesses to the virtual memory pages;
determining a degree of contiguity between the accessed virtual memory pages; and
mapping sets of the accessed virtual memory pages to respective single physical memory pages, wherein:
each respective single physical memory page is an integral multiple of a number of virtual memory pages in the sets of the accessed virtual memory pages;
the virtual memory pages are implemented in non-volatile secondary memory remotely accessible by a processor-based computer system; and
the physical memory pages are implemented as dynamic random access memory (DRAM) directly accessible or local to the processor-based computer system.

2. The method of claim 1 wherein the virtual memory pages are assumed to be sequentially accessed to form at least a set of contiguous accessed virtual memory pages.

3. The method of claim 1 further comprising:
performing a profile run to determine a plurality of virtual memory pages that are accessed contiguously; and
mapping the determined contiguously accessed virtual memory pages to the respective single physical memory pages.

4. The method of claim 1 further comprising:
analyzing memory accesses as they are performed by the processor-based computer system to identify a plurality of virtual memory pages that are accessed contiguously;
determining a cost of re-mapping the identified virtual memory pages relative to a benefit based on processor cycle consumption by the processor-based computer; and
mapping the identified virtual memory pages if the benefit exceeds the cost.

5. The method of claim 4 wherein analyzing memory accesses further comprises analyzing a temporal proximity of sequential pairs of virtual memory pages of the plurality of virtual memory pages.

6. The method of claim 5 further comprising analyzing one or more other properties of the memory accesses to modify a mapping of the virtual memory pages to the respective physical memory pages, wherein the one or more other properties comprises write intensity, virtual page permission and access types, durations of virtual memory page accesses, and a power consumption characteristic of the virtual memory accesses.

7. The method of claim 1 wherein the method is implemented as an operating system process executed by the processor-based computer.

8. The method of claim 1 wherein the method is implemented at least in part as a hardware circuit associated with a memory controller device or the physical memory and performing a lookup table process to convert virtual memory addresses to physical memory addresses.

9. An apparatus for mapping virtual memory pages to physical memory pages, comprising:
a first component analyzing a sequence of accesses to the virtual memory pages;
a second component determining a degree of contiguity between the accessed virtual memory pages; and
a third component mapping sets of the accessed virtual memory pages to respective single physical memory pages and each respective single physical memory page is an integral multiple of a number of virtual memory pages in the sets of the accessed virtual memory pages, and wherein the virtual memory pages are implemented in non-volatile secondary memory remotely accessible by a processor-based computer system, and wherein the physical memory pages are implemented as dynamic random access memory (DRAM) directly accessible or local to the processor-based computer system.

10. The apparatus of claim 9 wherein the virtual memory pages are assumed to be sequentially accessed to form at least a set of contiguous accessed virtual memory pages.

11. The apparatus of claim 9 further comprising a fourth component performing a profile run to determine a plurality of virtual memory pages that are accessed contiguously, and mapping the determined contiguously accessed virtual memory pages to the respective single physical memory pages.

12. The apparatus of claim 9 further comprising a fifth component analyzing memory accesses as they are performed by the processor-based computer system to identify a plurality of virtual memory pages that are accessed contiguously, determining a cost of re-mapping the identified virtual memory pages relative to a benefit based on processor cycle consumption by the processor-based computer, and mapping the identified virtual memory pages if the benefit exceeds the cost.

* * * * *